INVENTORS.
Martin L. Klingler and
William R. Evans
BY

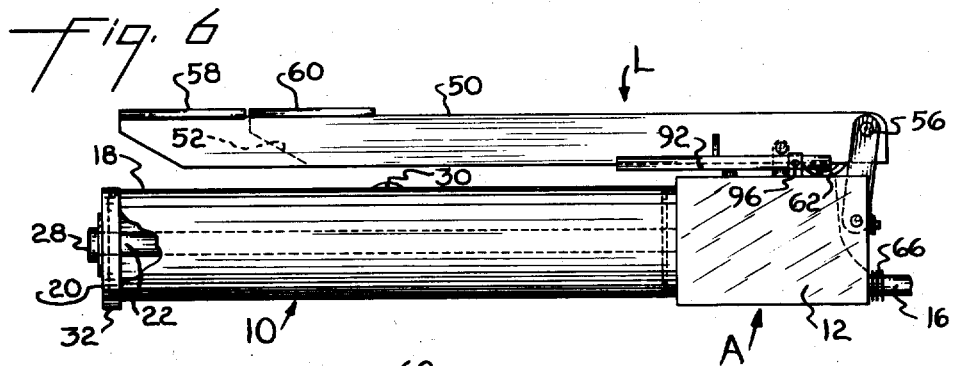
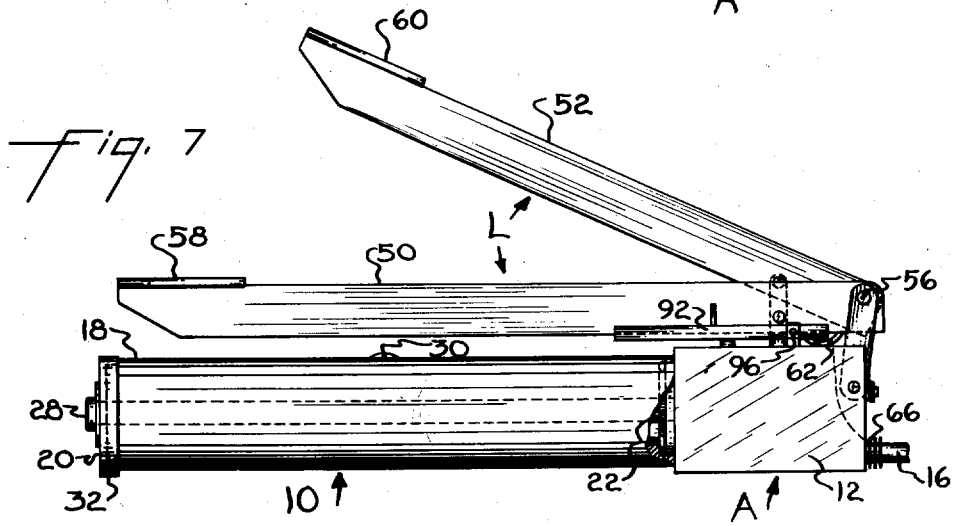
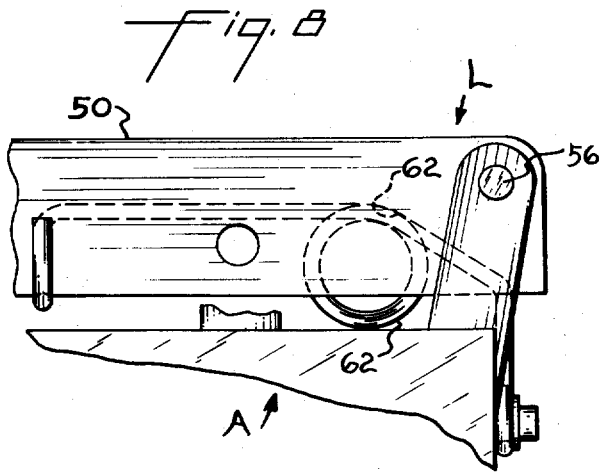
INVENTORS.
Martin L. Klingler and
William R. Evans
BY

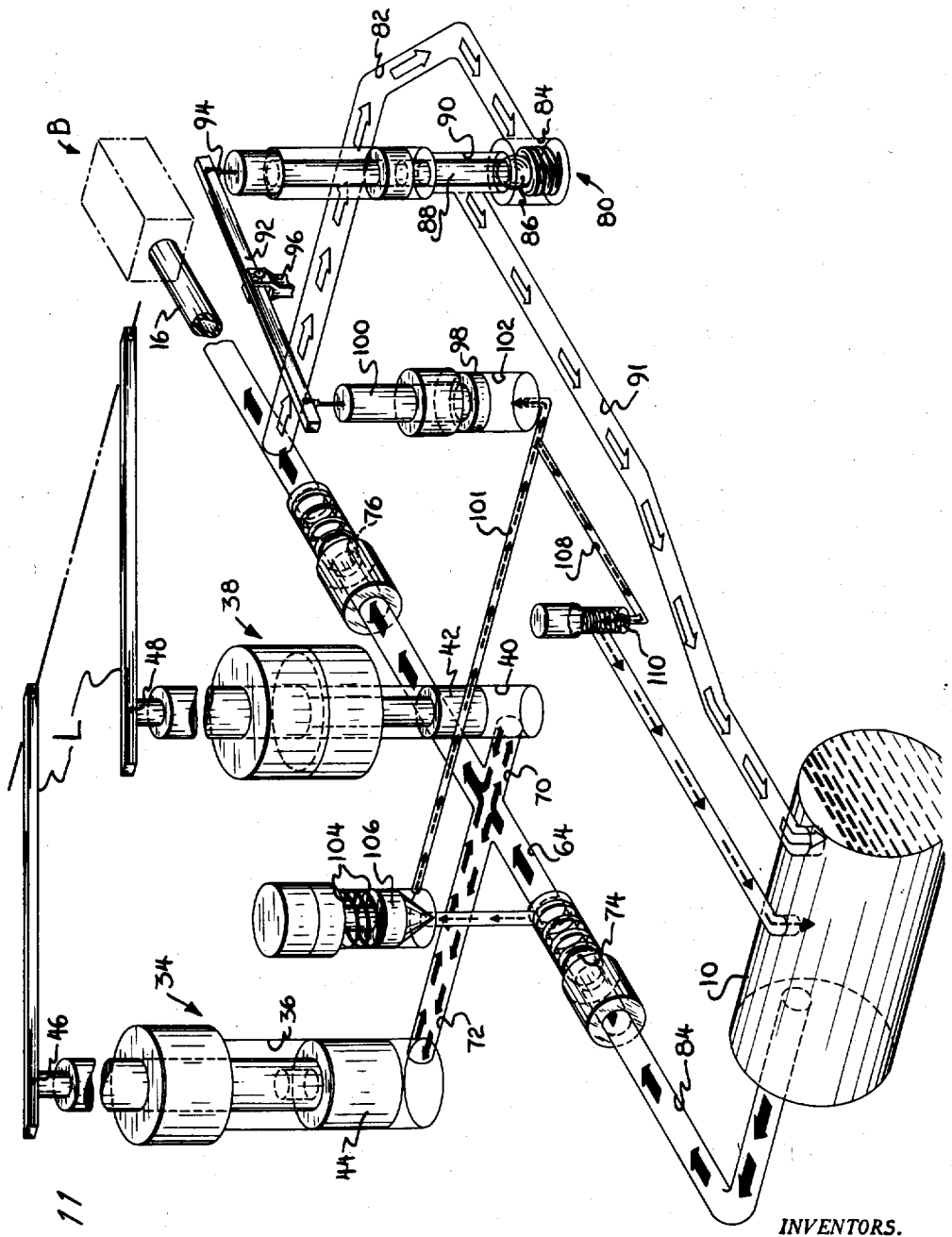

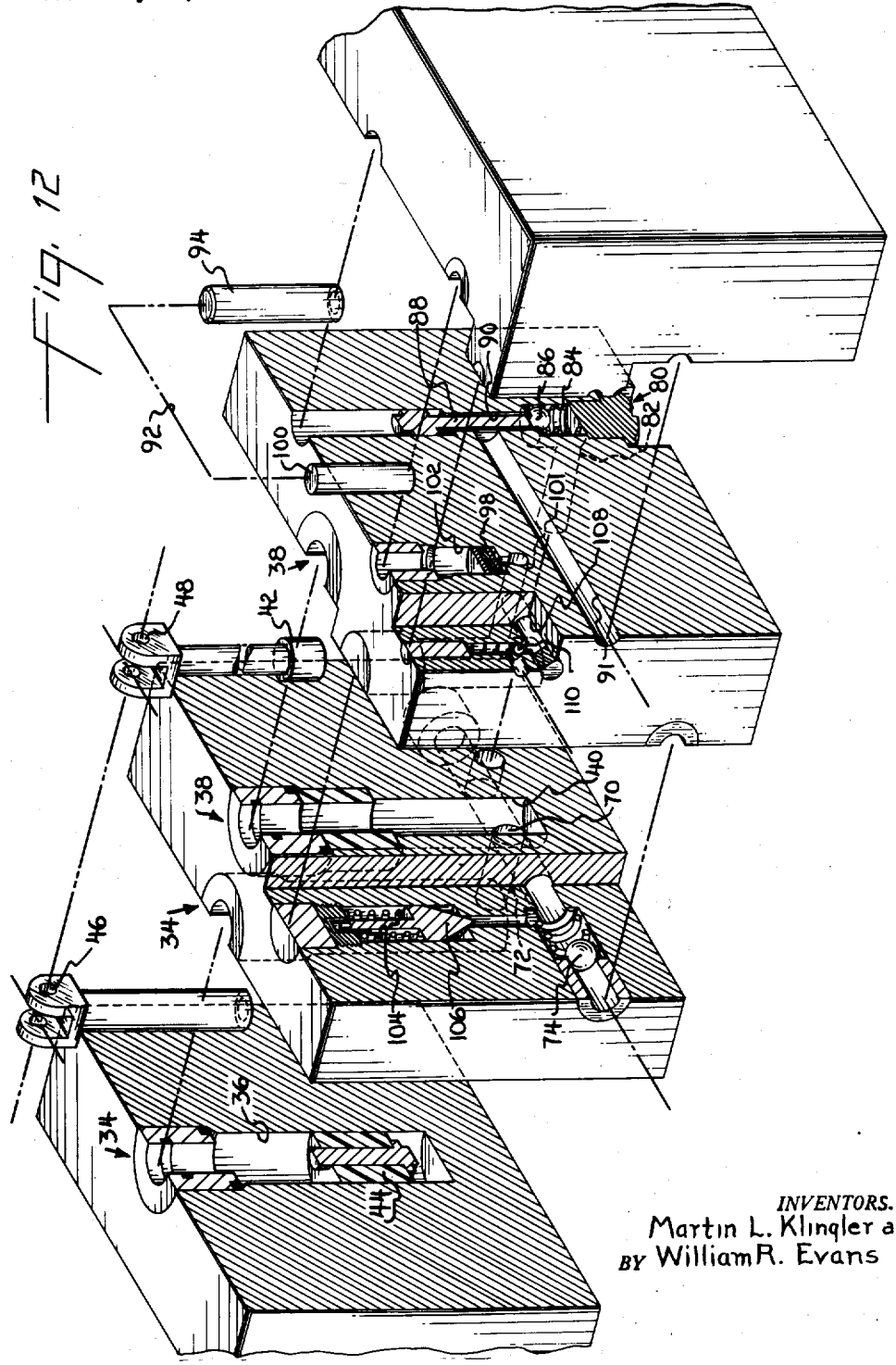

United States Patent Office 2,921,438
Patented Jan. 19, 1960

1

2,921,438

MANUALLY OPERATED HYDRAULIC TOOL HAVING MEANS FOR RELEASING FLUID PRESSURE AND BY-PASS VALVE MEANS FOR MAINTAINING ITS RELEASED CONDITION

Martin L. Klingler and William R. Evans, Hershey, Pa., assignors to AMP Incorporated, Harrisburg, Pa.

Application May 20, 1955, Serial No. 509,870

6 Claims. (Cl. 60—52)

In producing a secure and efficient electrical connection, it is highly advantageous to join the members by crimping them together into intimate relationship with each other by the use of pressure operated tools. By employing foot-operated, hydraulic tools the extreme pressures required may be obtained without the use of heavy equipment.

Furthermore, the use of a foot-operated tool to achieve such pressures has the added effect of leaving the operator's hands free to accomplish other operations incidental to making a proper connection.

With this in mind, it is an object of the invention to provide a foot-operated pump to be used with a crimping head.

It is also an object of this invention to provide a hydraulic pump which may be foot-operated, that has a plurality of levers adapted to be operated simultaneously or individually, whereby one lever strokes a comparatively large piston for pumping large quantities of fluid, while another lever strokes a comparatively small piston for pumping small increments of fluid. This permits the operator to force fluid through the system and rapidly advance the movable die until the resistance becomes pronounced, at which time the final pressure may be obtained by the use of the relatively small piston exclusively.

A further object of this invention is to provide a pumping system for a hydraulic crimping head or similar tool, wherein the fluid pressure is positively released after a predetermined crimping pressure has been reached. This release is effected by the fluid pressure in the system and maintains the release mechanism in its "release" position until the fluid bleeds out of the crimping head and a state of equilibrium is attained throughout the system.

It is a further object of this invention to provide a combination pump and crimping head, whereby the head is portable while the pump may be left in one place.

Other important features and objects of the invention to which reference has not been made hereinabove will appear hereinafter when the following description and claims are considered with the accompanying drawings, in which:

In the drawings:

Figure 6 is a side view of the foot pump showing the levers operated simultaneously;

Figure 7 is a side view of the foot pump, showing the high pressure lever operated independently of the low pressure lever;

2

Figure 9:
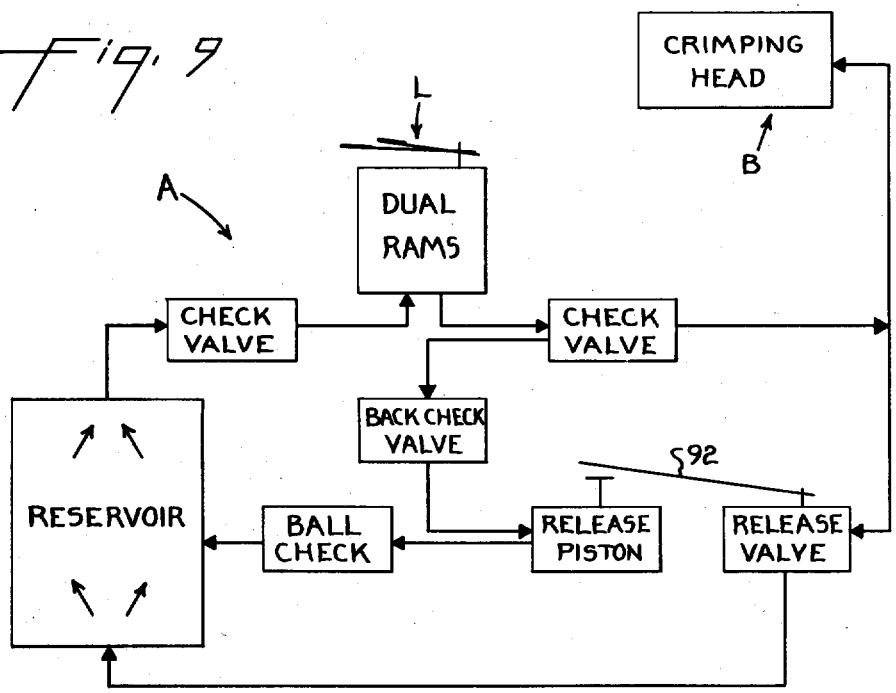
Figure 10:
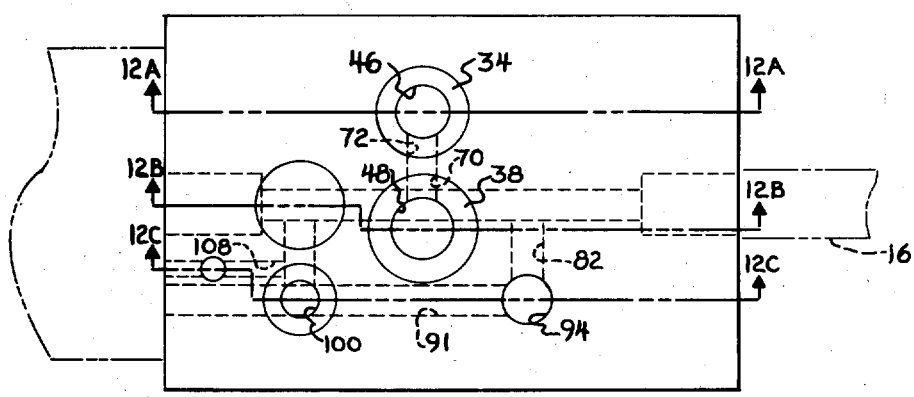

Figure 8 is a view showing the spring in relationship to the lever;

Figure 9 is a diagrammatic view showing the flow plan of the fluid;

Figure 10 is a top view of the block per se;

Figure 11 is a view of the fluid system showing the path of the fluid during the various phases of the operation; and Figure 12 is an exploded perspective view of the pumping block of Figure 10, as taken along section lines 12A—12A; 12B—12B; and 12C—12C on Figure 10 showing the relationship of parts as shown in Figure 11 when the parts are assembled within the pumping block.

Figure 1:
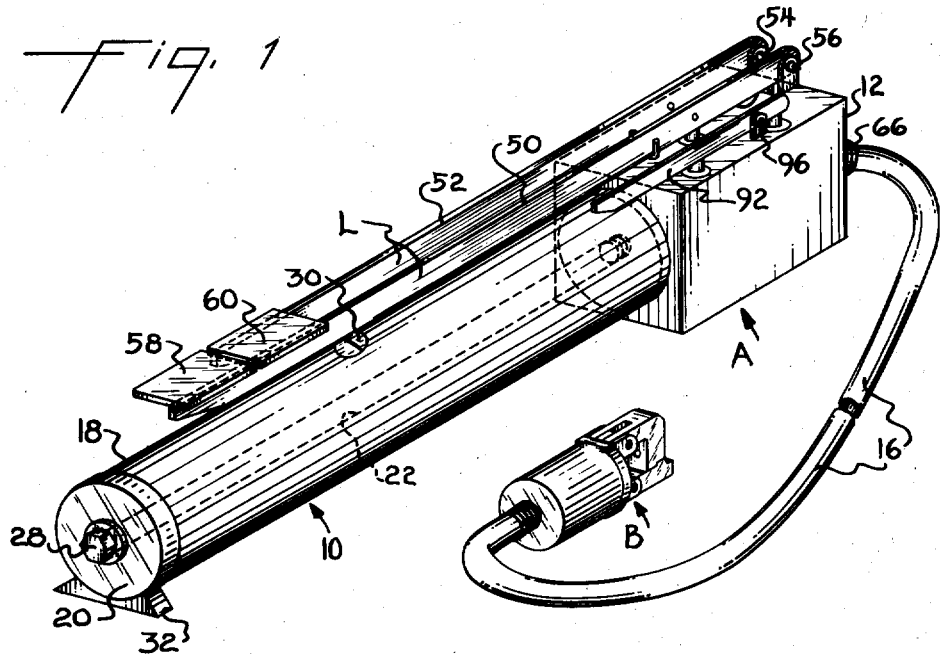
Figure 1 shows a perspective view of the pumping unit with the crimping head attached.
Figure 2:
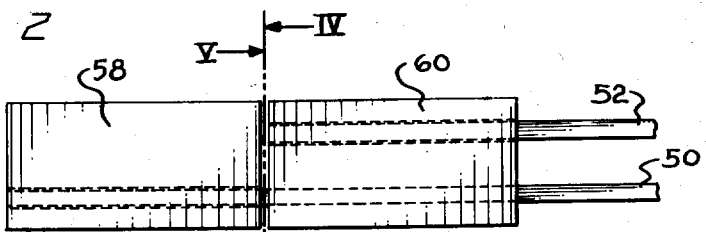
Figure 2 is a top view of the levers and plates.
Figure 3:
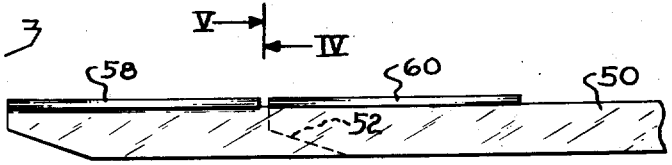
Figure 3 is a side view of the levers and plates.
Figure 4:
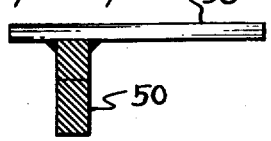
Figure 4 is a sectional view taken through IV—IV of Figure 2.
Figure 5:
Figure 5 is a sectional view taken through V—V of Figure 2.

As shown in Figure 1, the pumping unit generally designated "A" consists of the fluid reservoir 10, a pumping block 12 and pumping levers L. A flexible hose 16 carries fluid from the pumping unit A to the crimping head B. The head B may be any well known type of crimping tool having relatively movable dies, urged toward each other under fluid pressure.

The reservoir 10 consists of a hollow sleeve 18 which contains a supply of hydraulic fluid. One end of this sleeve fits flush against the pumping block 12, while the other end of the sleeve is closed by an end plate 20, thus forming a fluid-tight reservoir. A rod 22, threaded at each end, cooperates with the pumping block and the end plate (through nut 28, see Figures 6 and 7) to firmly secure the pumping block, sleeve and end plate in fluid-tight relationship. An opening 30 is provided in the reservoir for filling the reservior with hydraulic fluid. While the fluid reservoir 10 may be any desired shape, it is shown to be a cylinder in the illustrated embodiment with a flat-stand 32 to lend stability to the assembly.

The pumping block 12 is generally rectangular in the preferred form and contains the components for operating and controlling the flow of fluid.

The ram units of the illustrative embodiment include a low-pressure ram 34 enclosed in cylinder 36 and a high-pressure ram 38 enclosed in cylinder 40. The ram 34 is designated a low-pressure ram because due to its comparatively large size it pumps a relatively large amount of fluid during the intake and exhaust cycle. This ram is utilized in the initial stages of the operation when there is little resistance and a relatively low pressure is required, since the only work accomplished is in moving the dies to a crimping position. When the resistance becomes appreciable the "high pressure" ram 38 which has a comparatively smaller piston takes over, and the pressure is built up by increments. While a greater number of strokes are required, with the high pressure ram, it is possible to attain the very high pressures required in a crimping operation. Thus in operation the low-pressure ram and the high-pressure ram work in concert for quick-closing of the dies in the initial stage of the operation and then the high pressure ram is employed exclusively to attain the final crimping pressure. Of course any combination of high and low pressure rams may be employed, but the described preferment includes one high pressure ram and one low pressure ram as illustrated.

As shown in Figure 11 the piston rods 42, 44 are pivoted at 48 and 46 to the levers 50, 52 which in turn are pivoted at 56 and 54 respectively to the block 12. This linkage enables lever 50 to operate the high pressure ram while lever 52 operates the low pressure ram. The levers extend rearwardly in side-by-side relationship (see Figures 1, 6 and 7) and an operating plate is secured to the rear end of each lever. The operating plate 58 is secured to the high pressure lever 50 while the operating plate 60 is secured to the low pressure lever 52.

The low pressure lever 52 is shorter than the high pressure lever 50 (see Figures 2, 3, 6 and 7), and the plate 58 which operates the high pressure lever is positioned forwardly of the plate 60 which operates the low pressure lever. The plates 58 and 60 are positioned adjacent each other so that the operator may conveniently operate both levers simultaneously with one foot (or hand).

A pair of sear springs 62 (Figure 8) are connected between the block 12 and the levers 50, 52 to return the levers to their upward positions after the downstroke.

As described above, the levers operate rams 34 and 38, positioned in cylinders 36 and 40 respectively. A fluid passageway 64 flows from the reservoir 10 through the block 12 and emanates from the block at port 66 at which point it connects with the hose 16 which carries fluid to the crimping head B. Within the block 12, branch passageways 70, 72 flow from the main fluid passageway 64 to the respective cylinders 36 and 40.

Referring to Figure 11 a back-check valve 74 is positioned at the entrance to fluid passageway 64 which permits the fluid to flow from the reservoir to the passageway 64 but prevents the flow of fluid in the opposite direction. Another back-check valve 76 at the exit of fluid passageway 64 permits fluid to flow out of the passageway into the hose 16 through port 66 but prevents flow in the reverse direction. Thus on the upstroke of levers 50, 52 which raise rams 34, 38, the fluid is drawn into the cylinders 36, 40 through the open valve 74. The back-check valve 76 prevents the fluid in the hose from being drawn back into the cylinders. On the downstroke the fluid is forced past check valve 76 into the crimping head (as shown by the solid arrows) to develop the necessary crimping force. Again back-check valve 76 prevents the fluid in the hose and crimping head from escaping back into the cylinders.

Consider next the release valve 80 for allowing the fluid to return to the reservoir 10 from the crimping head B after the crimp has been completed. A fluid passageway 82 leads from the main passageway 64 to a release valve chamber generally designated 84. The passageway 82 connects the release valve chamber 84 to the main fluid passageway 64 downstream of the back-check valve 76, i.e.: between the back-check valve 76 and the hose 16. Thus release valve 80 permits fluid to bleed out of the head and back into the reservoir as shown by the phantom arrows on Figure 11. The release valve 80 consists of chamber 84 which is counter-bored so that the chamber 84 has a greater inside diameter than the line carrying the fluid from the head back to the reservoir. A ball valve 86 ordinarily blocks the escape of fluid from the chamber 84. The illustrated means for releasing the ball valve 86 consists of a rod 88 slidable in chamber 90. The rod 88 is actuated by the movement of beam 92, to which it is connected at one end of the beam by a pivoted link 94. The beam is fulcrumed by a support 96 and the operating force is applied to the opposite end of the beam 92 so that the beam acts as a lever of the first class. Tilting the beam 92 so that the rod 88 unseats ball valve 86 permits fluid to flow from the hose 68 through the passageway 82, chamber 84, past ball valve 86, and through passageway 91 back to the reservoir 10 (the rod 88 being smaller than chamber 90 to permit flow of fluid).

A fluid-operated piston 98 functions as the operating means which tilts the beam 92 thus releasing valve 80. Piston rod 100 is pivotally attached to the beam 92 at the opposite end from the rod 88. Passageway 101 connects the cylinder 102 containing piston 98 to the main fluid passageway 64 through a spring loaded (104) back-check valve 106. The load on the spring is so adjusted that it corresponds to the desired crimping pressure. Thus the release valve will not be actuated until the desired crimping force is attained; after the desired crimping pressure has been attained, any further increase in pressure will open back-check valve 106 whereby the fluid will be forced through passageway 101 to cylinder 102 where it bears against the working face of the piston 98 to urge the piston to the top of the stroke (see dotted arrows). This tilts the beam 92 so that the release valve rod 88 unseats the ball 86 thus permitting fluid to evacuate from the hose 16 and return to the reservoir 10.

Another fluid line 108 is provided to bleed fluid from the cylinder 102 back to the reservoir 10 to reset the release valve 80 for the subsequent crimping operation. A ball check valve 110 is provided in the bleeder line 108 to prevent the escape of fluid during the release stroke but permit the escape of fluid when it is desired to reset the release valve.

Of course necessary packing and other sealing means are provided where required.

Operation

To effect a proper crimp, the electrical conductor and the terminal are properly positioned in the crimping head B. The plates 58, 60, on the levers 50, 52, form a foot-treadle for operating levers 50, 52. In the initial stages of the operation both levers are operated simultaneously to provide a quick take-up of the die. The levers 50, 52 operate the pistons 42, 44 to draw fluid out of reservoir 10 and force it into the crimping head B under pressure as shown by the solid arrows in Figure 11. When the pressure in the head builds up to a degree that makes operation of the levers difficult, the low pressure lever is no longer used. The operator continues to actuate the high pressure lever to develop the necessary crimping pressure in the head. When the necessary crimping pressure is attained further strokes of the lever will develop sufficient pressure to overcome the spring 104 in the back check valve 106. This unseats the valve and permits fluid to flow into the cylinder 102. The fluid pressure against the working face of piston 98 causes the piston and piston rod to rise, tilt beam 92 depressing rod 88 to unseat ball valve 86. Unseating ball valve 86 releases the pressure built up in the head B by permitting the fluid to flow back to the reservoir, as shown by the phantom arrows. The ball check valve 110 prevents escape of the fluid from the cylinder 102 during the releasing operation so that the release valve is constantly maintained in an open position until reset by the operator. To reset the release valve 80, the operator manually adjusts the beam 92 to a position which forces the piston 98 back to its original position. Since the fluid in the cylinder cannot return through back-check valve 106, it is forced through ball valve 110, back to the reservoir.

Some hydraulic tools now in use have a spring load back-check valve to permit the escape of fluid in the head after the desired crimping pressure is attained. However in such tools the pressure in excess of the crimping pressure is the only pressure released. In such a tool it is often difficult to know when the crimping pressure has been attained. Also a separate release mechanism must be provided for bleeding the pressure from the system. However in the tool shown in this application the fluid pressure is positively released when the desired crimping pressure is attained and such release is maintained until reset by the operator.

Changes in construction will occur to those skilled in the art and various apparently different modifications and embodiments may be made without departing from the scope of the invention. The matter set forth in the foregoing description and accompanying drawings is offered by way of illustration only. The actual scope of the invention is intended to be defined in the following claims when viewed in their proper perspective against the prior art.

We claim:

1. A device for pumping fluid to a fluid operated tool including: a fluid system including a fluid reservoir, a plurality of ram piston pump means, each pump means being actuated by a pump lever for urging fluid under pressure from the reservoir to the tool, whereby the fluid pressure operates the tool, means for automatically releasing the fluid in the tool at a predetermined pressure, said means including a first check valve in the system between said pump means and the reservoir and a second check valve between said pump means and the tool, and means for maintaining the released condition including a by-pass valve means between the first and second check valves which admits fluid pressure to the release means at a predetermined pressure.

2. The device of claim 1 wherein the means for maintaining the released condition includes a piston operated plunger which is operated by the fluid supplied through the by-pass valve and a lever means which is operated by the fluid and actuates the release means to permit fluid to return to the reservoir.

3. The device of claim 2 including an overload by-pass valve between the overload release and the reservoir to permit fluid to return to the reservoir when the overload release valve is reset.

4. The device of claim 1 wherein said pump means includes a pair of ram cylinders, one relatively large for driving a relatively large body of fluid at a relatively low pressure and the other relatively small for driving a relatively small body of fluid at a relatively high pressure.

5. The device of claim 4 wherein the pump means are provided with means for operating both levers simultaneously but permitting them to be operated separately.

6. In a fluid system wherein a pump is used to build up a maximum pressure in a fluid operated tool, the subcombination of a pair of hydraulic rams for pumping the fluid, a piston rod secured to each of said rams, one of said rams having a relatively large piston, and the other ram having a relatively small piston and means for actuating said rams including a relatively long lever and a relatively short lever in side by side relationship, one of the levers being pivotally attached to the piston rod of the smaller ram, and the other lever being pivotally attached to the piston rod of the larger ram and a projection extending from one of the levers so that part of the other lever is within the periphery of the projection, whereby both rams may be operated initially when resistance is slight to build up toward a maximum very quickly, and the smaller ram may be used independently when the pumping operation becomes more difficult.

References Cited in the file of this patent

UNITED STATES PATENTS

| | | |
|---|---|---|
| 1,134,608 | Gottschalk | Apr. 6, 1915 |
| 1,290,430 | Wainwright | Jan. 7, 1919 |
| 1,660,720 | Osborne | Feb. 28, 1928 |
| 1,731,145 | MacMillin | Oct. 8, 1929 |
| 1,760,989 | Lewis | June 3, 1930 |
| 1,897,898 | Gerard | Feb. 14, 1933 |
| 1,995,815 | Purdum | Mar. 26, 1935 |
| 2,058,377 | Francis | Oct. 20, 1936 |
| 2,182,663 | Eby et al. | Dec. 5, 1939 |
| 2,414,484 | Page | Jan. 21, 1947 |
| 2,440,060 | Page | Apr. 20, 1948 |
| 2,451,700 | Van Trine | Oct. 19, 1948 |
| 2,605,999 | Schultz | Aug. 5, 1952 |
| 2,649,076 | Dupre | Aug. 18, 1953 |
| 2,662,475 | McLellan | Dec. 15, 1953 |
| 2,687,149 | Badeau | Aug. 24, 1954 |
| 2,693,218 | Freedom | Nov. 2, 1954 |
| 2,696,850 | Peterson | Dec. 14, 1954 |
| 2,766,631 | Van Sittert | Oct. 16, 1956 |
| 2,776,624 | Reinhard | Jan. 8, 1957 |